US012760563B2

(12) United States Patent
Chen et al.

(10) Patent No.: US 12,760,563 B2
(45) Date of Patent: Oct. 13, 2026

(54) UNLOCKING TRANSMISSION MECHANISM FOR ELECTRIC CONTROL SYSTEM OF EMERGENCY EXIT DOOR LOCK AND MULTI-SELECTIVE KIT THEREOF

(71) Applicant: Shanghai Ming Wei Hardware Co., Ltd., Shanghai (CN)

(72) Inventors: Jung-Chung Chen, Shanghai (CN); Pei-Qi Chen, Shanghai (CN); Ting-Yu Chen, Shanghai (CN)

(73) Assignee: Shanghai MingWei Hardware Co., Ltd., Shanghai (CN)

( * ) Notice: Subject to any disclaimer, the term of this patent is extended or adjusted under 35 U.S.C. 154(b) by 481 days.

(21) Appl. No.: 18/310,984

(22) Filed: May 2, 2023

(65) Prior Publication Data

US 2024/0295138 A1 Sep. 5, 2024

(30) Foreign Application Priority Data

Mar. 2, 2023 (TW) ................................ 112107632

(51) Int. Cl.
*E05B 65/10* (2006.01)
*E05B 47/00* (2006.01)
*E05B 47/02* (2006.01)

(52) U.S. Cl.
CPC .......... *E05B 65/108* (2013.01); *E05B 47/023* (2013.01); *E05B 65/1053* (2013.01); *E05B 2047/002* (2013.01)

(58) Field of Classification Search
CPC ............. E05B 47/0001; E05B 47/0005; E05B 47/0012; E05B 65/1046; E05B 65/108
See application file for complete search history.

(56) References Cited

U.S. PATENT DOCUMENTS 3,854,763 A * 12/1974 Zawadzki ........... E05B 47/0002 292/201
5,011,199 A * 4/1991 Lowe .................. E05B 47/0002 292/DIG. 65
2004/0041412 A1* 3/2004 Cohrs, Jr. ........... E05B 65/1053 292/92

(Continued)

FOREIGN PATENT DOCUMENTS

GB 2541023 A * 2/2017 ........... E05B 65/108

*Primary Examiner* — Kristina R Fulton
*Assistant Examiner* — Emily G. Brown
(74) *Attorney, Agent, or Firm* — MUNCY, GEISSLER, OLDS & LOWE, P.C.

(57) ABSTRACT

An unlocking transmission mechanism is driven by a power transmission shaft of an electric control system to unlock an emergency exit door lock. The unlocking transmission mechanism includes a fixed base assembly, a slidable base assembly, a linear driving assembly, a transmission member and a linkage member. The transmission member is pivotally connected to the slidable base assembly, and the linkage member is pivotally connected to the transmission member. When the linear driving assembly is driven by the power transmission shaft to drive the slidable base assembly to move along a linear sliding stroke in an unlock-driving direction, the transmission member and the linkage member are sequentially driven to drive a manual-operated press bar assembly to unlock the emergency exit door lock. In addition, a multi-selective kit for the unlocking transmission mechanism is also provided.

5 Claims, 13 Drawing Sheets

(56) References Cited

U.S. PATENT DOCUMENTS

| | | | | |
|---|---|---|---|---|
| 2008/0092679 | A1* | 4/2008 | Tateishi | F16H 25/2015<br>74/89.23 |
| 2015/0137528 | A1* | 5/2015 | Geringer | E05B 47/0012<br>292/144 |
| 2017/0102058 | A1* | 4/2017 | Stephenson | E05B 47/0012 |
| 2021/0040775 | A1* | 2/2021 | Kusanale | H02K 7/06 |
| 2022/0145668 | A1* | 5/2022 | Bogdanov | E05B 65/1093 |

* cited by examiner

UNLOCKING TRANSMISSION MECHANISM FOR ELECTRIC CONTROL SYSTEM OF EMERGENCY EXIT DOOR LOCK AND MULTI-SELECTIVE KIT THEREOF

This application claims the benefit of Taiwan Patent Application Serial No. 112107632, filed Mar. 2, 2023, the subject matter of which is incorporated herein by reference.

BACKGROUND OF THE INVENTION

(1) Field of the Invention

The invention relates to an unlocking mechanism and a multi-selective kit thereof, and more particularly to the unlocking transmission mechanism and the multi-selective kit thereof for an electric control system of an emergency exit door lock.

(2) Description of the Prior Art

Due to the rise of safety awareness, various safety regulations have pretty strict requirements for emergency exit doors of the buildings and the associated emergency exit door locks, so as to ensure that when a fire, earthquake or other disasters occur, people in the building can be released and escape immediately.

In another aspect, because the emergency exit door itself also has access control requirements to prevent irrelevant people from entering the building. Therefore, in practice, the emergency exit door lock is normally kept locked, and a group of manual-operated unlocking mechanisms are usually installed on a side of the emergency exit door facing the interior of the building or the escape line, so that, when a disaster occurs, the personnel in the building can manually operate the manual-operated unlocking mechanism to unlock the emergency exit door lock. In addition, on the other side of the emergency exit door facing away from the inside of the building or the escape line, an external-operated unlocking mechanism is usually installed to drive the emergency exit door lock to unlock, so that people outside the building can use this unlocking device (such as a key, a remote control or another electronic control device) to drive the external-operated unlocking mechanism.

Since the installation locations of the aforesaid manual-operated unlocking mechanism and external-operated unlocking mechanism are different, thus they usually need to operate independently and cannot be shared to each other. Therefore, more components are required to meet the installation of the internal unlocking and external unlocking mechanisms. Nevertheless, to the emergency exit door lock itself, one of popular types is a press-bar type emergency exit door lock. This press-bar type emergency exit door lock can be designed into an inclined front press-bar type emergency exit door lock or an inclined rear press-bar type emergency exit door lock. Any of these twopress-bar type emergency exit door locks includes an inclined front or rear press-bar type manual-operated press bar assembly to perform the internal unlocking through the corresponding manual-operated unlocking mechanism.

Mechanisms for these two types of press-bar type emergency exit door locks are different from each other and cannot be fully compatible, so the external-operated unlocking mechanism is usually designed and produced separately in response to the different mechanisms of these two types of press-bar type emergency exit door locks. Obviously, introducing two different external-operated unlocking mechanisms will not only increase the production cost, but also increase the burden on spare parts management. More importantly, when the lock installer picks up the component package for installing the external-operated unlocking mechanism, there is a high risk of getting the wrong component package, and, once a wrong component package is taken, the installation will fail. In addition, when the external-operated unlocking mechanism is driven by an electric control system, the electric control system may also have to be designed and manufactured separately for these two different external-operated unlocking mechanisms, which adds a lot of additional manufacturing and installation costs.

SUMMARY OF THE INVENTION

In view of the aforesaid prior art, in response to different types of press-bar type emergency exit door locks, it is inevitable to manufacture multiple external-operated unlocking mechanisms. As such, an increase in production cost can be expected, and the risk of picking up the wrong component package is always high. Hence, the problems with increased component management burden is always there. Accordingly, it is an object of the present invention to provide an unlocking transmission mechanism and a multi-selective kit thereof for an electric control system of an emergency exit door lock, for supporting the electric control system to drive the existing press-bar type emergency exit door lock to unlock, and, with the multi-selective kit to support the electric control system to unlock different existing press-bar type emergency exit door locks.

In an aspect of this invention, an unlocking transmission mechanism for an electric control system of an emergency exit door lock is driven by a power transmission shaft of the electric control system to unlock the emergency exit door lock. The emergency exit door lock includes a manual-operated press bar assembly. The unlocking transmission mechanism includes a fixed base assembly, a slidable base assembly, a linear driving assembly, a magnet, a transmission member and a linkage member.

The fixed base assembly is fixed to a press-bar base of the emergency exit door lock. The slidable base assembly is disposed at the fixed base assembly within a linear sliding stroke to be reciprocally movable in an unlocking-driving direction. The linear driving assembly is driven by the power transmission shaft to further drive the slidable base assembly to move in the unlocking-driving direction within the linear sliding stroke. The magnet is disposed on the slidable base assembly. The transmission member has a first pivotal shaft and a second pivotal shaft. The first pivotal shaft is pivotally connected with the slidable base assembly. When the slidable base assembly moves in the unlocking-driving direction within the linear sliding stroke, the transmission member pivots about the first pivotal shaft to rotate the second pivotal shaft with respect to the first pivotal shaft. The linkage member is pivotally connected with the second pivotal shaft and the fixed base assembly. When the second pivotal shaft rotates with respect to the first pivotal shaft, the linkage member pushes a manual-operated press bar assembly of the emergency exit door lock to unlock the emergency exit door lock.

When an electromagnetic distance sensor of the electric control system detects a distance of the magnet to ensure that the slidable base assembly has moved to an unlocked end position within the linear sliding stroke, the electric control system has the power transmission shaft to stop driving the linear driving assembly, a resilience provided by the manual-operated press bar assembly drives sequentially the linkage member, the transmission member and the slidable base assembly to move the slidable base assembly in a locking-driving direction opposite to the unlocking-driving direction to arrive at a locked end position within the linear sliding stroke.

In one embodiment of this invention, the linear driving assembly can include a screw guide sleeve and a screw bar. The screw guide sleeve is driven by the power transmission shaft to rotate. The screw bar, fixedly connected with the slidable base assembly, engages the screw guide sleeve by screwing. When the screw guide sleeve is driven to rotate, the screw bar moves in the unlocking-driving direction within the linear sliding stroke, so as to drive the slidable base assembly synchronously to move in the unlocking-driving direction within the linear sliding stroke.

In one embodiment of this invention, the slidable base assembly is furnished with at least one positioning slot along the linear sliding stroke, the fixed base assembly includes at least one positioning pin, and the at least one positioning pin penetrates through the at least one positioning slot, so as to limit a movement of the slidable base assembly in the unlocking-driving direction. Preferably, the slidable base assembly can include two longitudinal standing plates and a horizontal standing plate, the two longitudinal standing plates are parallel to each other in the unlocking-driving direction, each of the two longitudinal standing plates is furnished with a positioning slot, the fixed base assembly includes at least one positioning pin, and the at least one positioning pin penetrates through the positioning slot of each of the two longitudinal standing plates, so as to limit a movement of the slidable base assembly in the unlocking-driving direction; wherein the horizontal standing plate is crossly connected fixedly with the two longitudinal standing plates by being perpendicular to the unlocking-driving direction. Preferably, the magnet is disposed at the horizontal standing plate so as conveniently for the electromagnetic distance sensor to detect the distance of the magnet.

In one embodiment of this invention, the linkage member can include a first linking end portion and a second linking end portion. The first linking end portion is pivotally connected with an end pivotal hole of the fixed base assembly, the second linking end portion is pivotally connected with the second pivotal shaft, and the emergency exit door lock is unlocked by having the linkage member to rotate and thus push a press-driving bar of the manual-operated press bar assembly with respect to the end pivotal hole.

In one embodiment of this invention, the linkage member includes a first linking portion, a second linking portion and a middle linking portion disposed between the first linking portion and the second linking portion, the second linking portion is pivotally connected with a middle pivotal hole of the fixed base assembly, and the middle linking portion is pivotally connected with the second pivotal shaft; wherein, when the second pivotal shaft rotates with respect to the first pivotal shaft, the second linking portion is rotated with respect to the middle pivotal hole and to push a lower press bar of the manual-operated press bar assembly so as to unlock the emergency exit door lock.

In another aspect of this invention, a multi-selective kit for an unlocking transmission mechanism for an electric control system of an emergency exit door lock is selectively assembled to an inclined front press-bar type emergency exit door lock or an inclined rear press-bar type emergency exit door lock. The inclined front press-bar type emergency exit door lock or the inclined rear press-bar type emergency exit door lock is unlocked by a power transmission shaft of the electric control system. Each of the inclined front press-bar type emergency exit door lock and the inclined rear press-bar type emergency exit door lock includes an inclined front press-bar type manual-operated press bar assembly and an inclined rear press-bar type manual-operated press bar assembly. The multi-selective kit includes a fixed base assembly, a slidable base assembly, a linear driving assembly, a magnet, a transmission member, a pin, a first linkage member and a second linkage member.

The fixed base assembly, configured for fixing a press-bar base of the inclined front press-bar type emergency exit door lock or the inclined rear press-bar type emergency exit door lock, is furnished with an end pivotal hole and a middle pivotal hole. The slidable base assembly is disposed at the fixed base assembly within a linear sliding stroke to be reciprocally movable in an unlocking-driving direction. The linear driving assembly is driven by the power transmission shaft to further drive the slidable base assembly to move in the unlocking-driving direction within the linear sliding stroke. The magnet is disposed on the slidable base assembly. The transmission member has a first pivotal shaft and a second pivotal shaft. The first pivotal shaft is pivotally connected with the slidable base assembly. When the slidable base assembly moves in the unlocking-driving direction within the linear sliding stroke, the transmission member pivots about the first pivotal shaft to rotate the second pivotal shaft with respect to the first pivotal shaft.

The first linkage member includes a first linking end portion and a second linking end portion. When the inclined front press-bar type emergency exit door lock is assembled, the first linking end portion utilizes the pin to pivotally connect the end pivotal hole, and the second linking end portion is pivotally connected with the second pivotal shaft. When the second pivotal shaft rotates with respect to the first pivotal shaft, the second linking end portion is rotated with respect to the end pivotal hole and thus to push a press-driving bar of the inclined front press-bar type manual-operated press bar assembly so as to unlock the inclined front press-bar type emergency exit door lock.

The second linkage member includes a first linking portion, a second linking portion and a middle linking portion located between the first linking portion and the second linking portion. When the inclined rear press-bar type emergency exit door lock is assembled, the second linking portion utilizes the pin to pivotally connect the middle pivotal hole, and the middle linking portion is pivotally connected with the second pivotal shaft. When the second pivotal shaft rotates with respect to the first pivotal shaft, the second linking portion is rotated with respect to the middle pivotal hole to contact and push a lower press bar of the inclined rear press-bar type manual-operated press bar assembly so as to unlock the inclined rear press-bar type emergency exit door lock.

The middle pivotal hole is disposed between the end pivotal hole and the slidable base assembly. When an electromagnetic distance sensor of the electric control system detects a distance of the magnet to ensure that the slidable base assembly has been moved to an unlocked end position within the linear sliding stroke, the power transmission shaft is stopped driving the linear driving assembly, and then a resilience provided by the inclined front press-bar type emergency exit door lock or the inclined rear press-bar type emergency exit door lock moves the slidable base assembly in a locking-driving direction opposite to the unlocking-driving direction to reach a locked end position within the linear sliding stroke.

In one embodiment of this invention, the linear driving assembly can include a screw guide sleeve and a screw bar.

The screw guide sleeve is driven by the power transmission shaft to rotate. The screw bar, fixedly connected with the slidable base assembly, engages the screw guide sleeve by screwing. When the screw guide sleeve is driven to rotate, the screw bar moves in the unlocking-driving direction within the linear sliding stroke, so as to drive the slidable base assembly synchronously to move in the unlocking-driving direction within the linear sliding stroke.

In one embodiment of this invention, the slidable base assembly is furnished with at least one positioning slot along the linear sliding stroke, the fixed base assembly includes at least one positioning pin, and the at least one positioning pin penetrates through the at least one positioning slot, so as to limit a movement of the slidable base assembly in the unlocking-driving direction. Preferably, the slidable base assembly can include two longitudinal standing plates and a horizontal standing plate, the two longitudinal standing plates are parallel to each other in the unlocking-driving direction, each of the two longitudinal standing plates is furnished with a positioning slot, the fixed base assembly includes at least one positioning pin, and the at least one positioning pin penetrates through the positioning slot of each of the two longitudinal standing plates, so as to limit a movement of the slidable base assembly in the unlocking-driving direction; wherein the horizontal standing plate is crossly connected fixedly with the two longitudinal standing plates by being perpendicular to the unlocking-driving direction. Preferably, the magnet is disposed at the horizontal standing plate so as conveniently for the electromagnetic distance sensor to detect the distance of the magnet.

As stated above, since the unlocking transmission mechanism for an electric control system of an emergency exit door lock provided in this disclosure can be directly connected with the electric control system and the manual-operated press bar assembly of the existing emergency exit door lock, thus the existing manual-operated press bar assembly can be integrated to unlock the emergency exit door lock. Thus, the production cost for manufacturing an additional external-operated unlocking mechanism can be saved.

Preferably, in the multi-selective kit for the unlocking transmission mechanism for an electric control system of an emergency exit door lock provided in this disclosure, since various components (i.e., the fixed base assembly, the slidable base assembly, the linear driving assembly, the magnet, the transmission member, the second pivotal shaft, the first linkage member, the second linkage member and the pin) common to different types of the emergency exit door locks are included, thus, according to different types of the emergency exit door locks (i.e., the inclined front press-bar type emergency exit door lock and the inclined rear press-bar type emergency exit door lock), relevant selections from the multi-selective kit can be integrated to unlock the specific emergency exit door lock. Undoubtedly, by providing the multi-selective kit, the additional production cost from manufacturing excessive external-operated unlocking mechanisms can be saved, the management cost in handling versatile accessories can be reduced, and the risk in adopting wrong components can be further lowered.

All these objects are achieved by the unlocking transmission mechanism for an electric control system of an emergency exit door lock and the multi-selective kit thereof described below.

BRIEF DESCRIPTION OF THE DRAWINGS

The present invention will now be specified with reference to its preferred embodiment illustrated in the drawings, in which.

DESCRIPTION OF THE PREFERRED EMBODIMENT

The invention disclosed herein is directed to an unlocking transmission mechanism for electric control system of emergency exit door lock and multi-selective kit thereof. In the following description, numerous details are set forth in order to provide a thorough understanding of the present invention. It will be appreciated by one skilled in the art that variations of these specific details are possible while still achieving the results of the present invention. In other instance, well-known components are not described in detail in order not to unnecessarily obscure the present invention.

Since the unlocking transmission mechanism for an electric control system of an emergency exit door lock provided in this invention can be driven by versatile electric control systems, thus it can be widely applied to the existing emergency exit door locks. In addition, according to different types of the emergency exit door locks, a multi-selective kit of the unlocking transmission mechanism for an electric control system of this invention can provide necessary parts to match a specific exit door lock for a locking and/or unlocking purpose. In the following description, perferred embodiments will be raised to explain such an application. In addition, the drawings in different embodiments are all in a very simplified form, and the components are not presented with absolutely precise ratios, but are only used for convenience and clarity to assist in explaining the purpose and function of the embodiments of the present invention.

Figure 1:
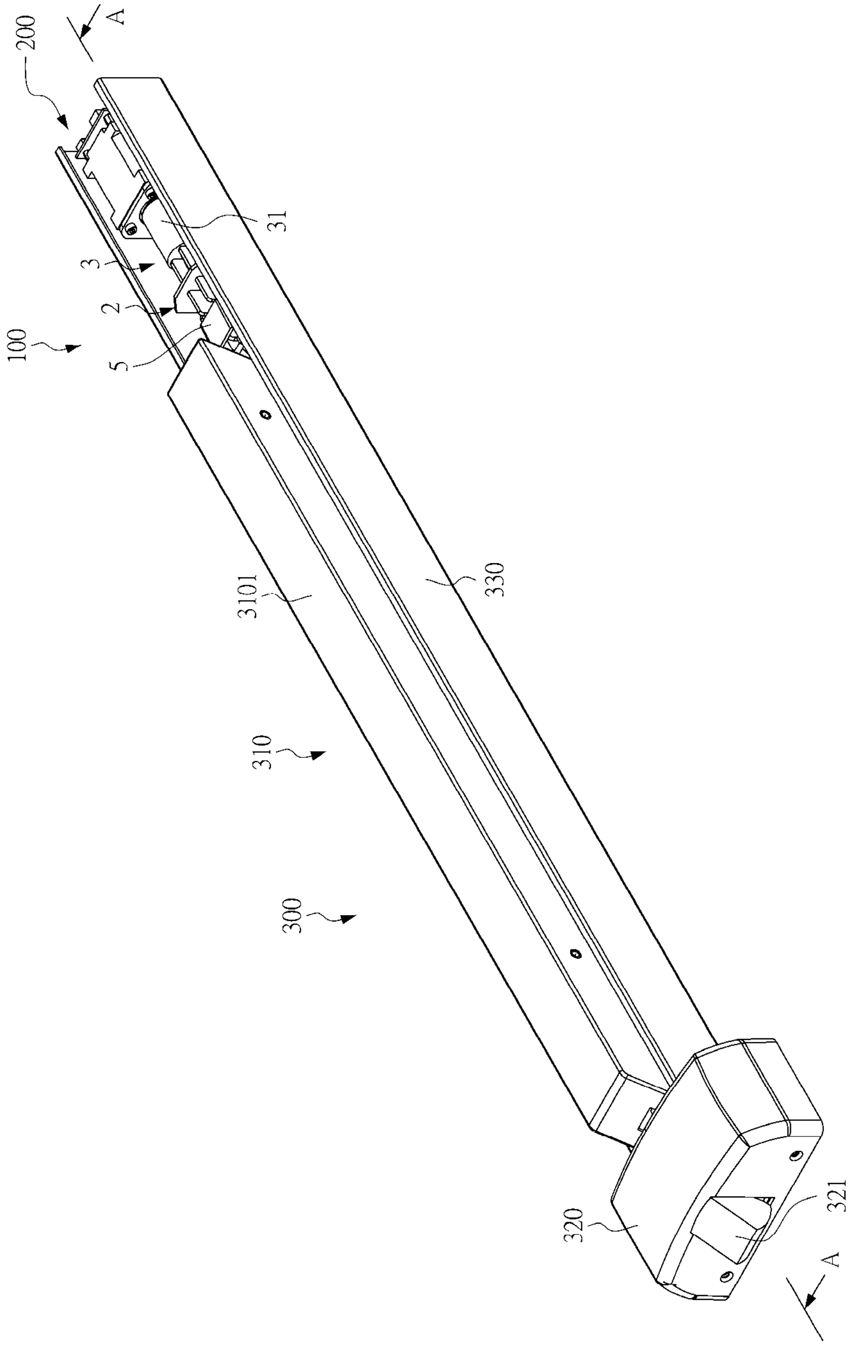
FIG. 1 is a schematic perspective view of a first embodiment of the unlocking transmission mechanism for an electric control system of an emergency exit door lock in a locked state and provided with the electric control system and the emergency exit door lock in accordance with this invention.
Figure 2:
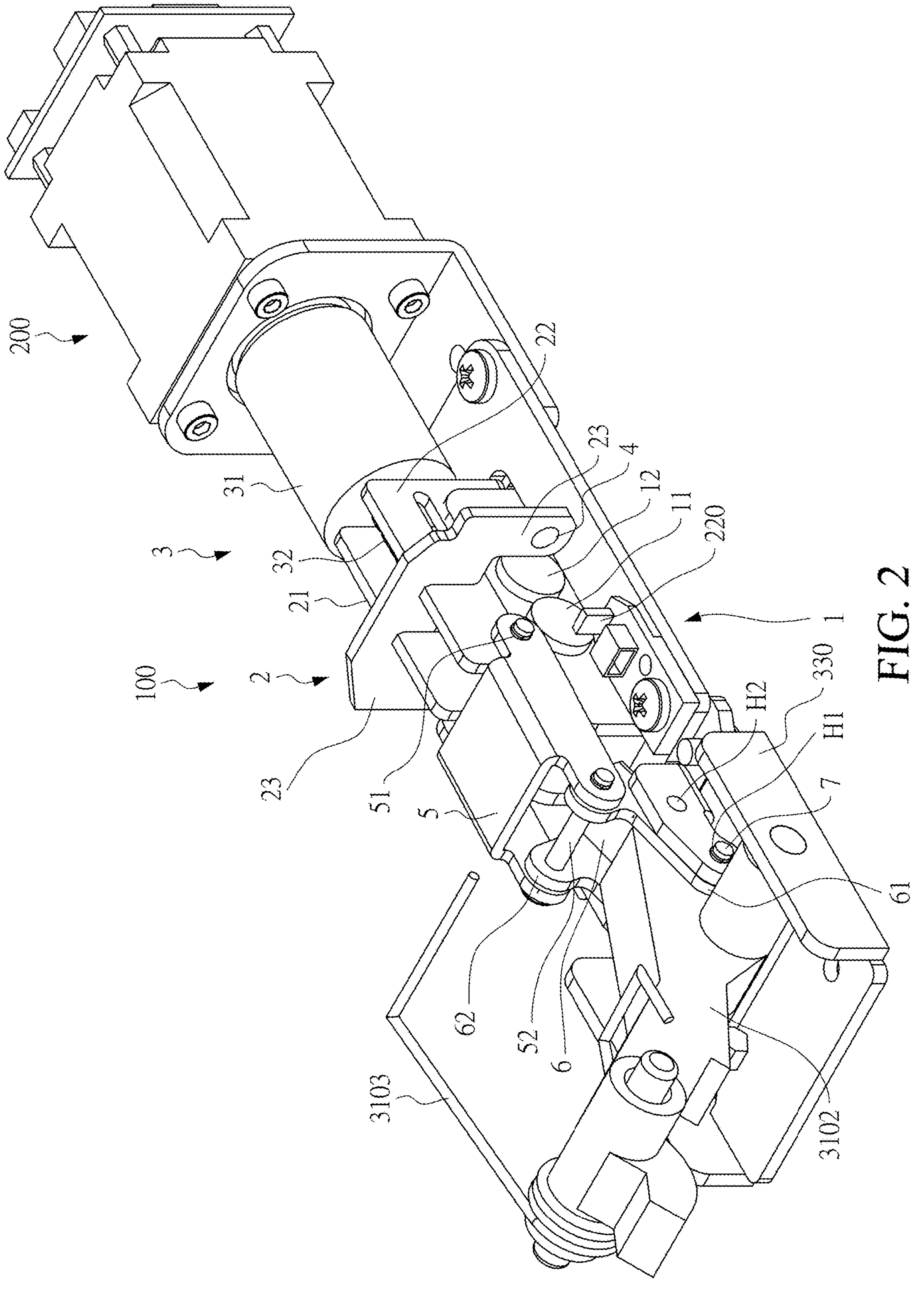
FIG. 2 demonstrates schematically a connection of the unlocking transmission mechanism, the electric control system and the emergency exit door lock of FIG. 1.
Figure 3:
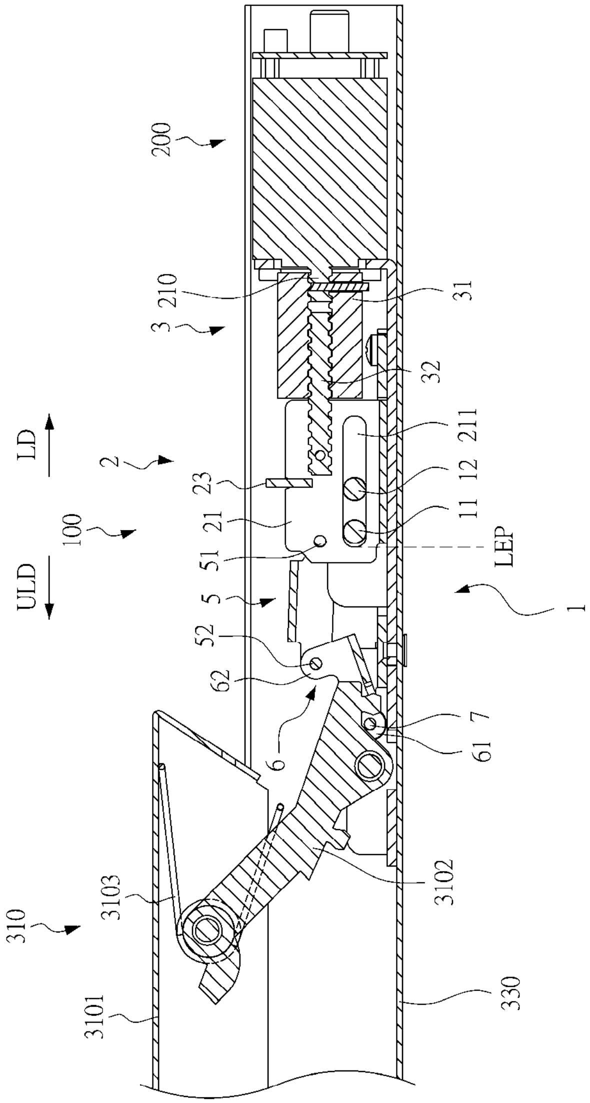
FIG. 3 is a schematic cross-sectional view of FIG. 1 along line A-A, to demonstrate the emergency exit door lock in the locked state.
Figure 4:
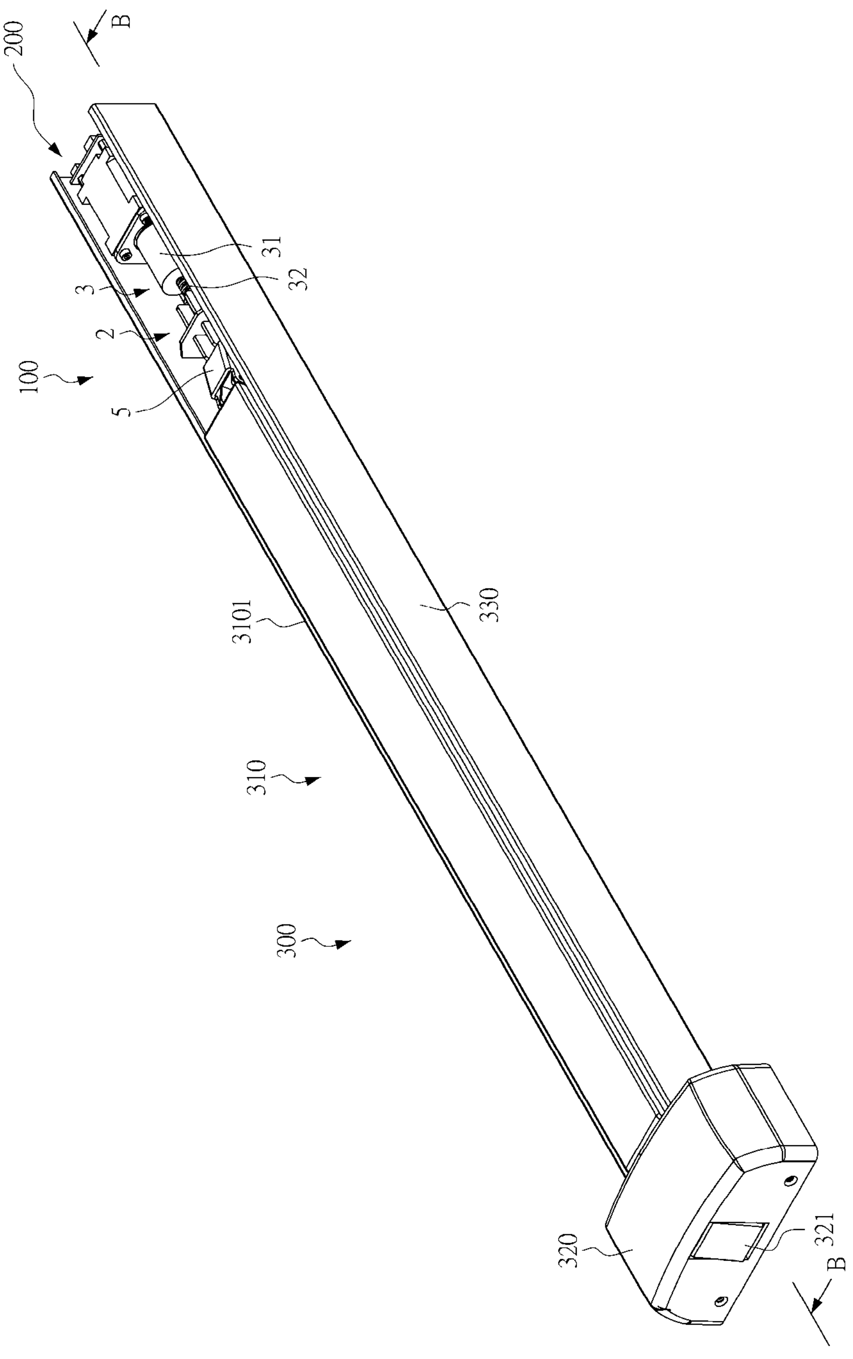
FIG. 4 demonstrates schematically an assembly of the unlocking transmission mechanism, the electric control system and the emergency exit door lock of FIG. 1 in an unlocked state.
Figure 5:
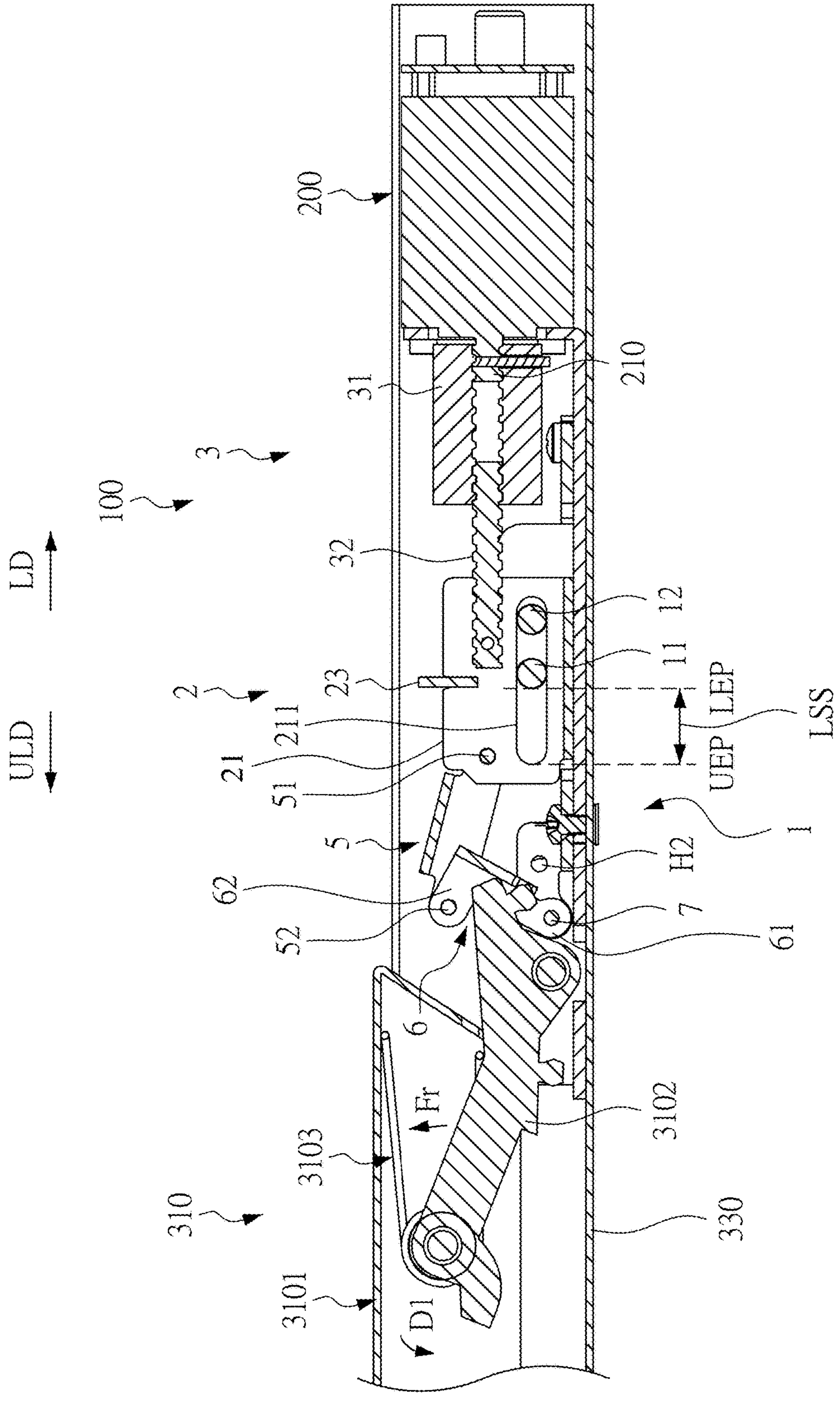
FIG. 5 is a schematic cross-sectional view of FIG. 4 along line B-B, to demonstrate the emergency exit door lock in the unlocked state.

Refer to FIG. 1 to FIG. 5; where FIG. 1 is a schematic perspective view of a first embodiment of the unlocking transmission mechanism for an electric control system of an emergency exit door lock in a locked state and provided with the electric control system and the emergency exit door lock in accordance with this invention, FIG. 2 demonstrates schematically a connection of the unlocking transmission mechanism, the electric control system and the emergency exit door lock of FIG. 1, FIG. 3 is a schematic cross-sectional view of FIG. 1 along line A-A to demonstrate the emergency exit door lock in the locked state, FIG. 4 demonstrates schematically an assembly of the unlocking transmission mechanism, the electric control system and the emergency exit door lock of FIG. 1 in an unlocked state, and FIG. 5 is a schematic cross-sectional view of FIG. 4 along line B-B, to demonstrate the emergency exit door lock in the unlocked state.

The unlocking transmission mechanism for an electric control system of an emergency exit door lock ("unlocking transmission mechanism" thereafter) 100 is driven by a power transmission shaft 210 of an electric control system 200 so as for unlocking an emergency exit door lock 300. The electric control system 200 controls the power transmission shaft 210 to transmit power according to a signal from a control device (such as a remote control, a fixed electric control switch, an access control device or a mobile communication device installed with an access control software).

In this embodiment, the emergency exit door lock 300, as a popular inclined front press-bar type emergency exit door lock, includes a manual-operated press bar assembly 310, a lock assembly 320 and a press-bar base 330. The press-bar base 330 is fixed on a door plate of the emergency exit door (not shown in the figure). The lock assembly 320 includes a locking tongue 321. The manual-operated press bar assembly 310, prepared for unlocking manually, includes a lower press bar 3101, at least one press-driving bar 3102 and at least one torsional spring 3103. In this embodiment, the manual-operated press bar assembly 310 is an inclined front press-bar type manual-operated press bar assembly. In this description, the term "inclined front press-bar type" implies that, when the lower press bar 3101 is depressed down, the press bar would be moved in an inclined direction close to the lock assembly 320. The press-driving bar 3102 is a link that is driven to move while the lower press bar 3101 is depressed down. The torsional spring 3103 would provide a resilience Fr to turn the lower press bar 3101 back elastically to a position prior to the down depression.

The unlocking transmission mechanism 100 includes a fixed base assembly 1, a slidable base assembly 2, a linear driving assembly 3, a magnet 4, a transmission member 5 and a linkage member 6. The fixed base assembly 1, fixed to the press-bar base 330 of the emergency exit door lock 300, includes at least one positioning pin. When a cross section of the positioning pin is a square, a rectangle or any shape with two parallel sides, a number of the positioning pin would be more than one. In this embodiment, the positioning pin is shaped to be a cylinder, and thus the fixed base assembly 1 has two positioning pins 11, 12 or more.

In addition, the fixed base assembly 1 is further furnished with an end pivotal hole H1 and a middle pivotal hole H2. The end pivotal hole H1 is disposed at an end of the fixed base assembly 1 away from the power transmission shaft 210, and the middle pivotal hole H2 is disposed between the aforesaid end and the slidable base assembly 2. Namely, the middle pivotal hole H2 is also located between the end pivotal hole H1 and the slidable base assembly 2.

The slidable base assembly 2 is disposed to the fixed base assembly 1 in a manner of being reciprocally movable along a linear sliding stroke LSS parallel to an unlocking-driving direction ULD. Preferably, the slidable base assembly 2 can include two longitudinal standing plates 21, 22 parallel to each other in the unlocking-driving direction ULD and a horizontal standing plate 23. Each of the longitudinal standing plates 21, 22 is furnished with a positioning slot 211, 221, respectively. The positioning pins 11, 12 are penetrating through the positioning slots 211, 221 of the longitudinal standing plates 21, 22, respectively, such that the movement of the slidable base assembly 2 in the unlocking-driving direction ULD can be limited. The horizontal standing plate 23 are fixedly to connect the two longitudinal standing plates 21, 22 by being perpendicular to the unlocking-driving direction ULD. It shall be noted that the aforesaid parallel or perpendicular relationships among the longitudinal standing plates 21, 22 and the horizontal standing plate 23 with respect to the unlocking-driving direction ULD are particularly referred to the corresponding surfaces, not to the corresponding normal vectors of the respective surfaces.

The linear driving assembly 3 is driven by the power transmission shaft 210 to displace the slidable base assembly 2 within the linear sliding stroke LSS in the unlocking-driving direction ULD. Practically, the linear driving assembly 3 can include a screw guide sleeve 31 and a screw bar 32. The screw guide sleeve 31 is driven to rotate by the power transmission shaft 210. The screw bar 32 is fixed to the slidable base assembly 2, and engages the guide sleeve 31 by screwing, so as to screw the guide sleeve 31 to rotate and thus displace within the linear sliding stroke in the unlocking-driving direction ULD. Thereupon, the slidable base assembly 2 can be moved synchronously within the linear sliding stroke LSS in the unlocking-driving direction ULD.

The magnet 4 is disposed on the horizontal standing plate 23 of the slidable base assembly 2, so as conveniently for an electromagnetic distance sensor 220 of the electric control system 200 to detect a distance of the magnet 4, and thus an exact position of the slidable base assembly 2 within the linear sliding stroke LSS can be ensured. In this disclosure, the electromagnetic distance sensor 220 can be a Hall sensor. The transmission member 5 has a first pivotal shaft 51 and a second pivotal shaft 52, in which the first pivotal shaft 51 penetrates through and pivotally connected with the longitudinal standing plates 21, 22 of the slidable base assembly 2. When the slidable base assembly 2 is displaced within the linear sliding stroke LSS in the unlocking-driving direction ULD, the transmission member 5 can be pivotally rotated about the first pivotal shaft 51, and thus the second pivotal shaft 52 can swing about the first pivotal shaft 51.

The linkage member 6 can include a first linking end portion 61 and a second linking end portion 62. The first linking end portion 61 utilizes a pin 7 to pivotally connect the end pivotal hole H1 of the fixed base assembly 1, and the second linking end portion 62 is pivotally connected with the second pivotal shaft 52. When the second pivotal shaft 52 is rotated with respect to the first pivotal shaft 51, the linkage member 6 would be rotated to push the press-driving bar 3102 of the manual-operated press bar assembly 310 with respect to the end pivotal hole H1. Thereupon, the locking tongue 321 would be moved to unlock the emergency exit door lock 300. Since the locking/unlocking of the locking tongue 321 through the press-driving bar 3102 by the transmission mechanism is already well-known in the art for the inclined front press-bar type emergency exit door lock, thus detail thereabout would be omitted herein.

Since the moving direction for the linkage member 6 to drive the press-driving bar 3102 is identical to that for the lower press bar 3101 to drive the press-driving bar 3102 (i.e., the first rotational direction D1). Thus, the linkage member 6 can be utilized to directly drive the press-driving bar 3102. In addition, in the first embodiment, the linkage member 6 would utilize an area thereof between the first linking end portion 61 and a second linking end portion 62 to contact and thus drive the press-driving bar 3102. Hence, the driving means of the first embodiment means is a middle-driving means; i.e., the middle portion of the linkage member 6 is utilized as a contact portion for driving.

When the emergency exit door lock 300 is in the locked state, the slidable base assembly 2 is disposed at a locked end position LEP of the linear sliding stroke LSS. When the slidable base assembly 2 is driven in the unlocking-driving direction ULD till the electromagnetic distance sensor 220 of the electric control system 200 can confirm, through sensing the magnet 4, that the slidable base assembly 2 has arrived at an unlocked end position UEP of the linear sliding stroke LSS, then the electric control system 200 has the power transmission shaft 210 to stop driving the linear driving assembly 3. Thereupon, the torsional spring 3103 of the manual-operated press bar assembly 310 can provide the resilience Fr to drive sequentially the lower press bar 3101, the press-driving bar 3102, the linkage member 6, the transmission member 5 and the slidable base assembly 2, so as to move the slidable base assembly 2 in a locking-driving direction LD, opposite to the unlocking-driving direction ULD, to a locked end position LEP of the linear sliding stroke LSS, and drive the locking tongue 362 to lock the emergency exit door lock 300 (i.e., the locked state).

Figure 6:
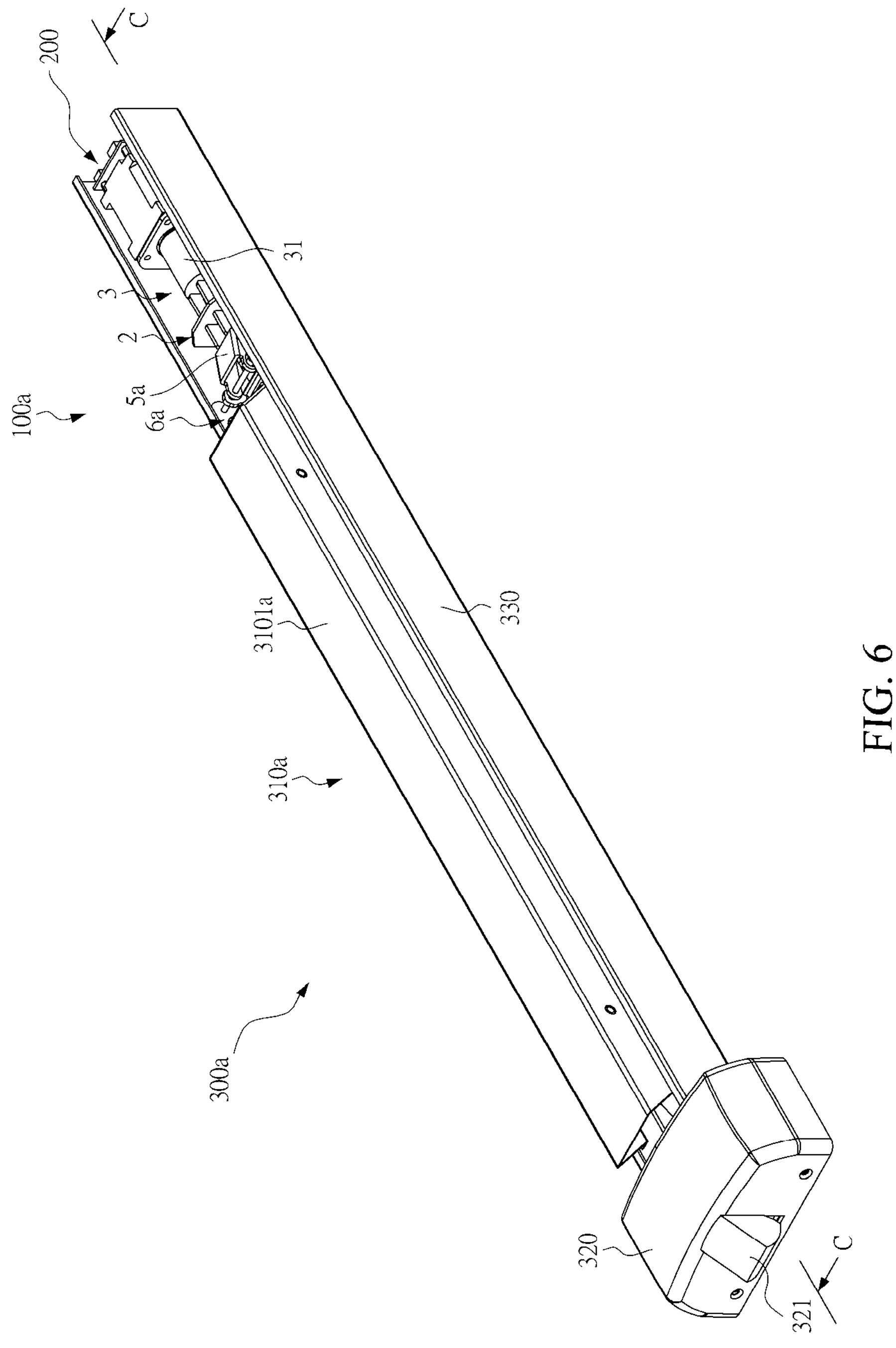
FIG. 6 demonstrates schematically an assembly of a second embodiment of the unlocking transmission mechanism, the electric control system and the emergency exit door lock in a locked state in accordance with this invention.
Figure 7:
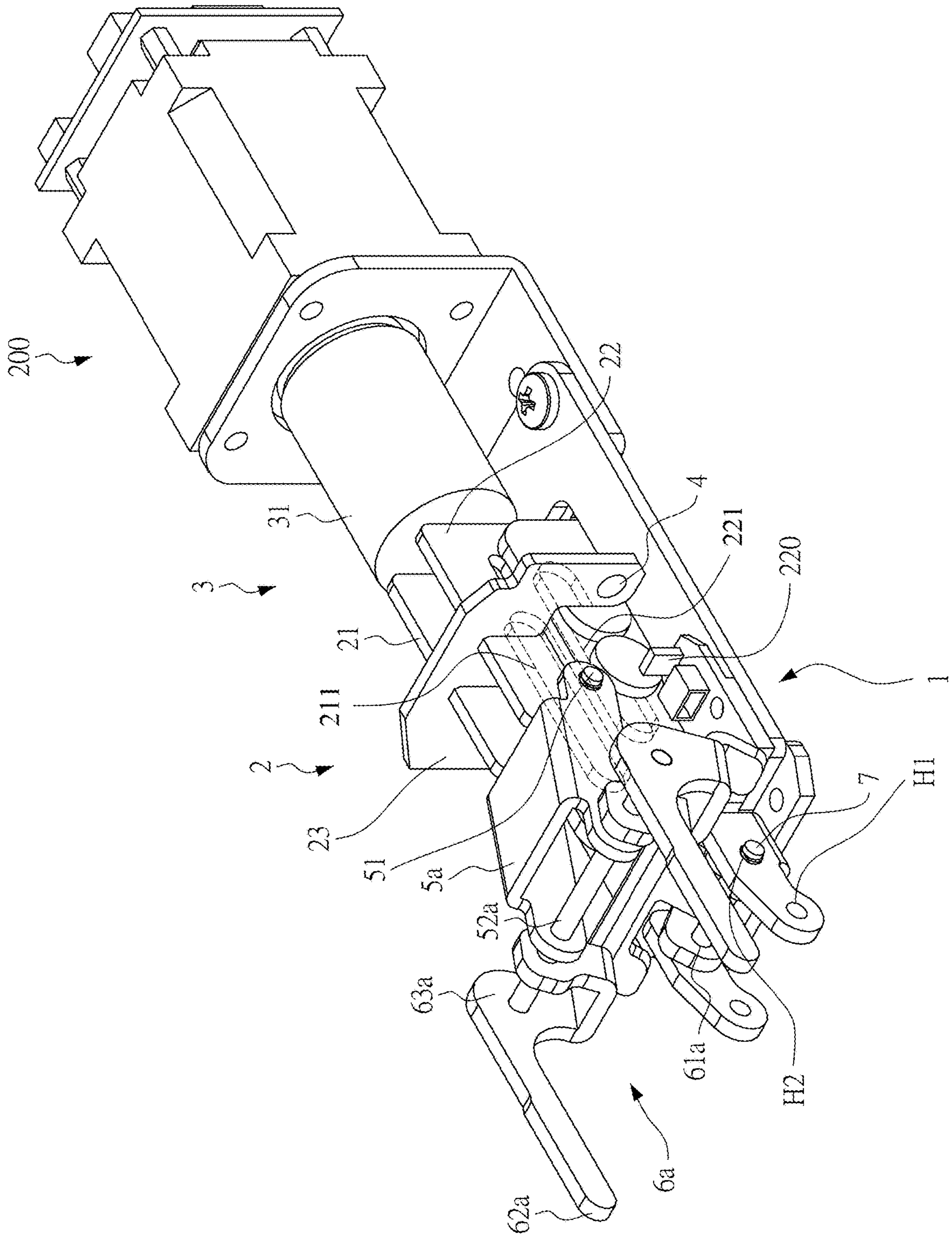
FIG. 7 demonstrates schematically a connection of the unlocking transmission mechanism, the electric control system and the emergency exit door lock of FIG. 6.
Figure 8:
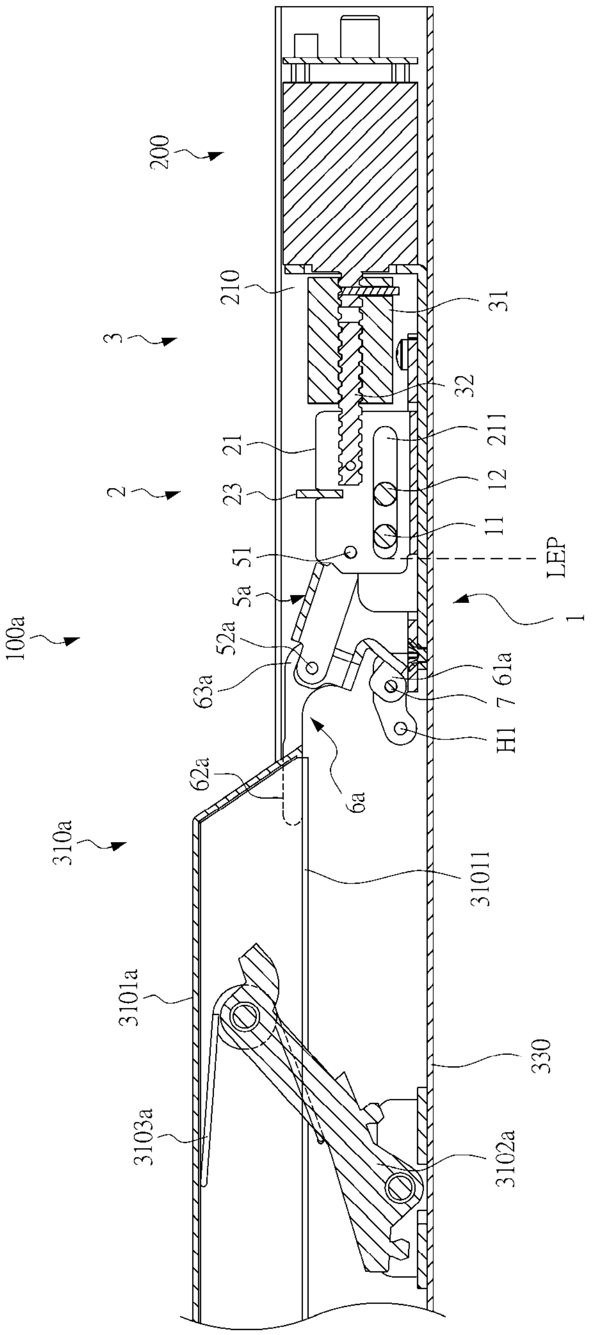
FIG. 8 is a schematic cross-sectional view of FIG. 6 along line C-C, to demonstrate the emergency exit door lock in the locked state.
Figure 9:
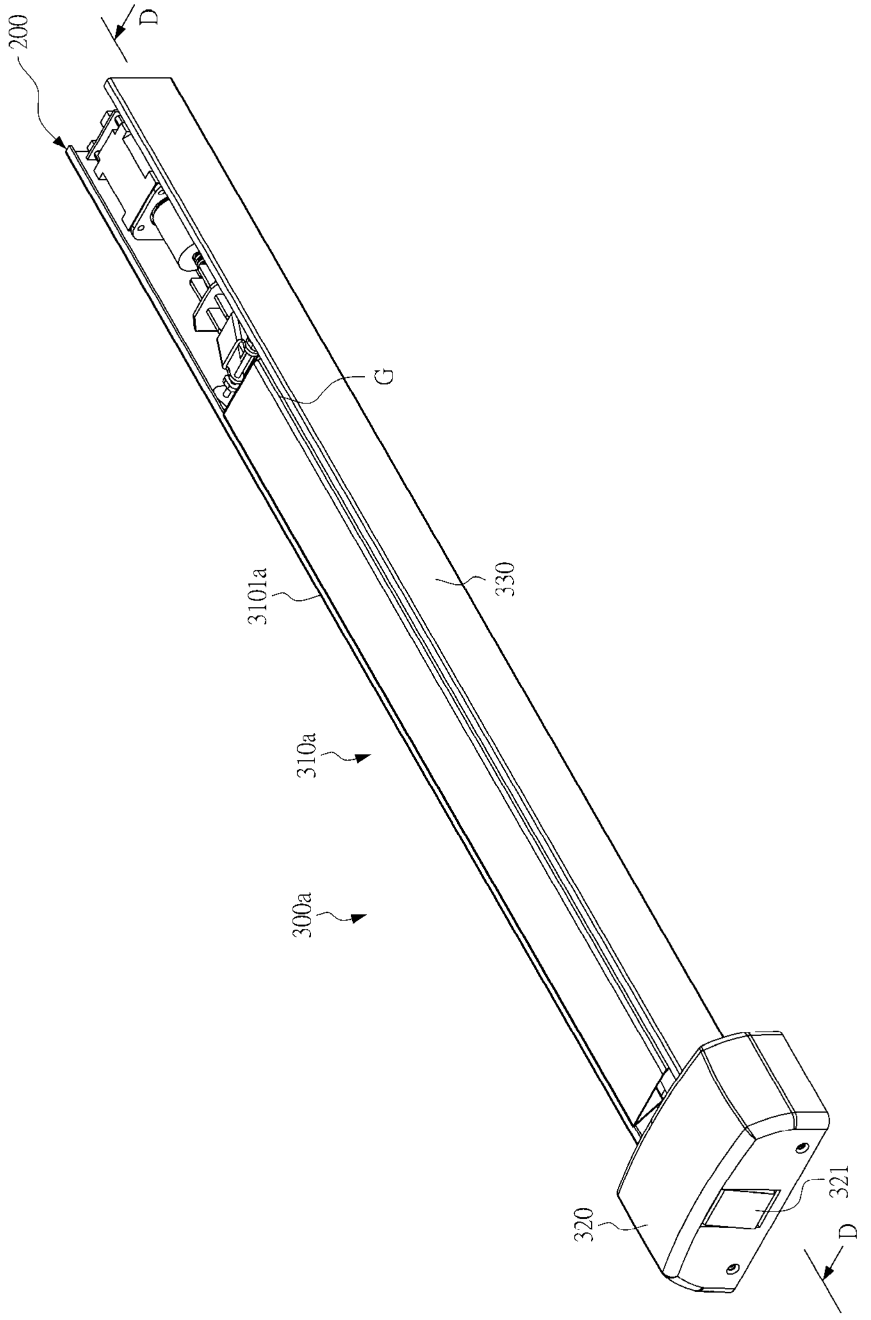
FIG. 9 demonstrates schematically an assembly of the unlocking transmission mechanism, the electric control system and the emergency exit door lock of FIG. 6 in an unlocked state.
Figure 10:
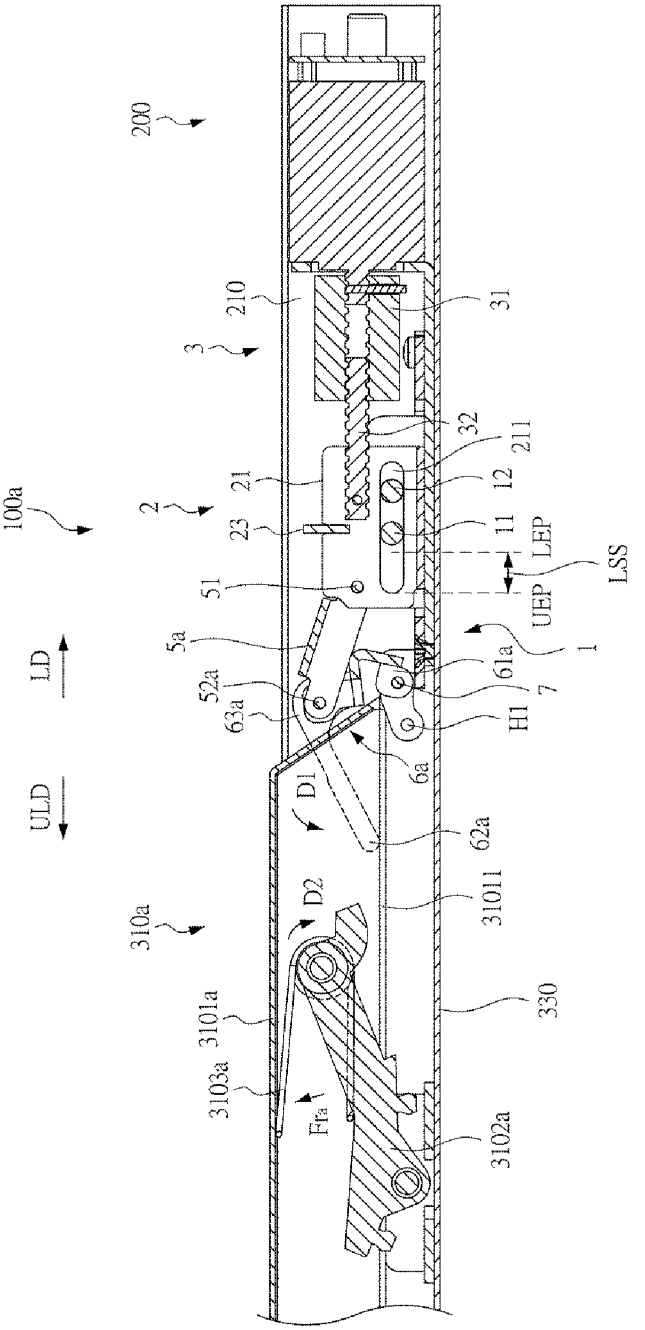
FIG. 10 is a schematic cross-sectional view of FIG. 9 along line D-D, to demonstrate the emergency exit door lock in the unlocked state.

Refer to FIG. 6 to FIG. 10, and FIG. 1 to FIG. 5 simultaneously; where FIG. 6 demonstrates schematically an assembly of a second embodiment of the unlocking transmission mechanism, the electric control system and the emergency exit door lock in a locked state in accordance with this invention, FIG. 7 demonstrates schematically a connection of the unlocking transmission mechanism, the electric control system and the emergency exit door lock of FIG. 6, FIG. 8 is a schematic cross-sectional view of FIG. 6 along line C-C to demonstrate the emergency exit door lock in the locked state, FIG. 9 demonstrates schematically an assembly of the unlocking transmission mechanism, the electric control system and the emergency exit door lock of FIG. 6 in an unlocked state, and FIG. 10 is a schematic cross-sectional view of FIG. 9 along line D-D to demonstrate the emergency exit door lock in the unlocked state.

Another unlocking transmission mechanism for an electric control system of an emergency exit door lock ("unlocking transmission mechanism" thereafter) 100*a* can be driven by the power transmission shaft 210 of the electric control system 200, so as to unlock the another emergency exit door lock 300*a*. In this embodiment, the emergency exit door lock 300*a* is a popular inclined rear press-bar type emergency exit door lock, and includes another manual-operated press bar assembly 310*a* and the aforesaid lock assembly 320 and press-bar base 330. Structuring, installation and working theories of the lock assembly 320 the press-bar base 330 of this embodiment are similar to those of the first embodiment, and thus refer to FIG. 1 to FIG. 5 and the corresponding paragraphs above.

The manual-operated press bar assembly 310*a* includes a lower press bar 3101*a*, at least one press-driving bar 3102*a* and at least one torsional spring 3103*a*. In this embodiment, the manual-operated press bar assembly 310*a* is an inclined rear press-bar type manual-operated press bar assembly. In this description, the term "inclined rear press-bar type" implies that, when the lower press bar 3101*a* is depressed down, the press bar would be moved in an inclined direction away from the lock assembly 320. The press-driving bar 3102*a* is a link that is driven to move while the lower press bar 3101*a* is depressed down. The torsional spring 3103*a* would provide a resilience Fra to turn the lower press bar 3101*a* back elastically to a position prior to the down depression.

The unlocking transmission mechanism 100*a* includes the aforesaid fixed base assembly 1, the aforesaid slidable base assembly 2, the aforesaid linear driving assembly 3, the aforesaid magnet 4, another transmission member 5*a* and another linkage member 6*a*. Structuring, installation and working theories of the fixed base assembly 1, the slidable base assembly 2, the linear driving assembly 3 and the magnet 4 of this embodiment are similar to those of the first embodiment, and thus refer to FIG. 1 to FIG. 5 and the corresponding paragraphs above.

A difference between the transmission member 5*a* and the transmission member 5 is that, in this embodiment, the another second pivotal shaft 52*a* is utilized to replace the second pivotal shaft 52 of the transmission member 5. Since the linkage members 6, 6*a* provide different crossing lengths, thus lengths of the second pivotal shafts 52, 52*a* would be adjusted accordingly. Since the crossing length of the linkage member 6*a* is greater than that of the linkage member 6, thus the length of the second pivotal shaft 52*a* would be larger than that of the second pivotal shaft 52. Practically, a longer second pivotal shaft 52*a* would be suitable for both the transmission members 5, 5*a*.

The linkage member 6*a* can include a first linking portion 61*a*, a second linking portion 62*a* and a middle linking portion 63*a* between the first linking portion 61*a* and the second linking portion 62*a*. The first linking portion 61*a* utilizes a pin 7 to pivotally connect the middle pivotal hole H2 of the fixed base assembly 1, and the middle linking portion 63*a* is pivotally connected with the second pivotal shaft 52. The second linking portion 62*a* is extended to enter a gap G between the lower press bar 3101*a* and the press-bar base 330.

When the second pivotal shaft 52*a* is rotated with respect to the first pivotal shaft 51, the linkage member 6*a* would be rotated with respect to the middle pivotal hole H2 so as to have the second linking portion 62*a* in the gap G to contact and push a base flange 31011, protruding into the gap G, at a bottom of the lower press bar 3101*a* of the manual-operated press bar assembly 310*a*, and the base flange 31011 further to move the press-driving bar 3102*a*. Thereupon, the locking tongue 321 would be moved to unlock the emergency exit door lock 300*a*. Since the locking/unlocking of the locking tongue 321 through the press-driving bar 3102*a* by the transmission mechanism is already well-known in the art for the inclined rear press-bar type emergency exit door lock, thus detail thereabout would be omitted herein.

Since the moving direction of the second linking portion 62*a* of the linkage member 6*a* is the first rotational direction D1, and the moving direction of the press-driving bar 3102_a_ is the second rotational direction D2. Thus, the second linking portion 62_a_ of the linkage member 6_a_ cannot be directly utilized to drive the press-driving bar 3102_a_, and the only way to drive the press-driving bar 3102_a_ is though the lower press bar 3101_a_. Thereupon, it is obvious that the unlocking means in this embodiment is different to that in the first embodiment. In addition, in the second embodiment, the linkage member 6_a_ would utilize the second linking portion 62_a_ to contact and thus drive the lower press bar 3101_a_. Hence, in this second embodiment, the driving means is a end-driving means; i.e., the end of the linkage member a is utilized as a contact portion for driving.

When the electromagnetic distance sensor 220 of the electric control system 200 detects a distance of the magnet 4 for ensuring that the slidable base assembly 2 has arrived the unlocked end position UEP within the linear sliding stroke LSS, the electric control system 200 would have the power transmission shaft 210 to stop driving the linear driving assembly 3, so as to utilize the resilience Fra provided by the torsional spring 3103_a_ of the manual-operated press bar assembly 310_a_ to sequentially drive the lower press bar 3101_a_, the linkage member 6_a_, the transmission member 5 and the slidable base assembly 2, such that the slidable base assembly 2 can displace in the locking-driving direction LD opposite to the unlocking-driving direction ULD to the locked end position LEP within the linear sliding stroke LSS. Simultaneously, the press-driving bar 3102_a_ and the locking tongue 321 are sequentially driven to lock the emergency exit door lock 300_a_ (i.e., into the locked state).

Figure 11:
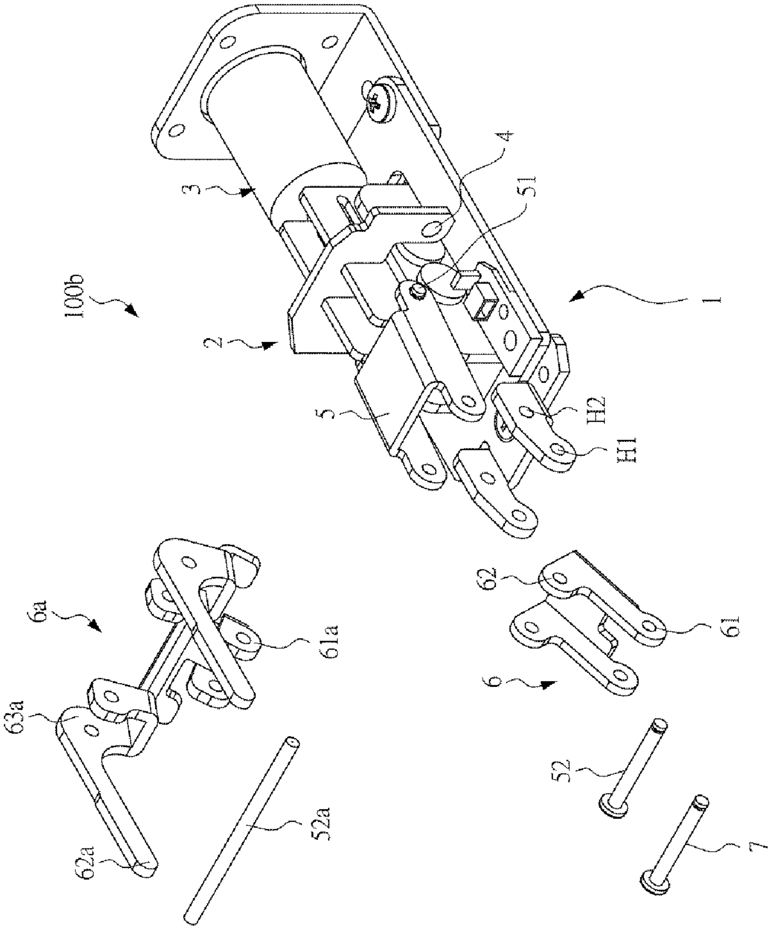
FIG. 11 is a schematic exploded view of a multi-selective kit of a third embodiment of the unlocking transmission mechanism, the electric control system and the emergency exit door lock in accordance with this invention.
Figure 12:
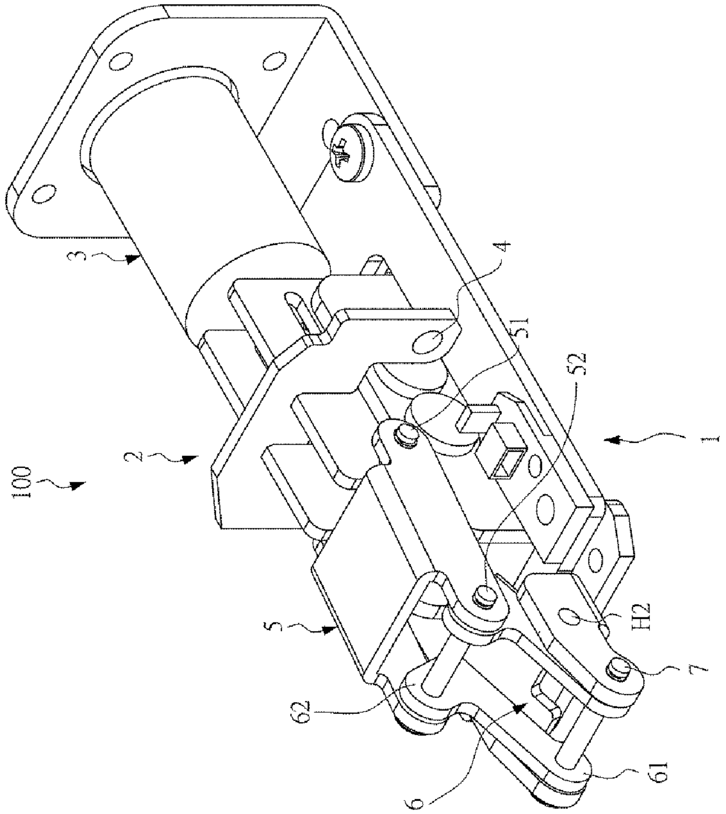
FIG. 12 demonstrates schematically that the unlocking transmission mechanism of FIG. 1 can be produced from part of the multi-selective kit of FIG. 11.
Figure 13:
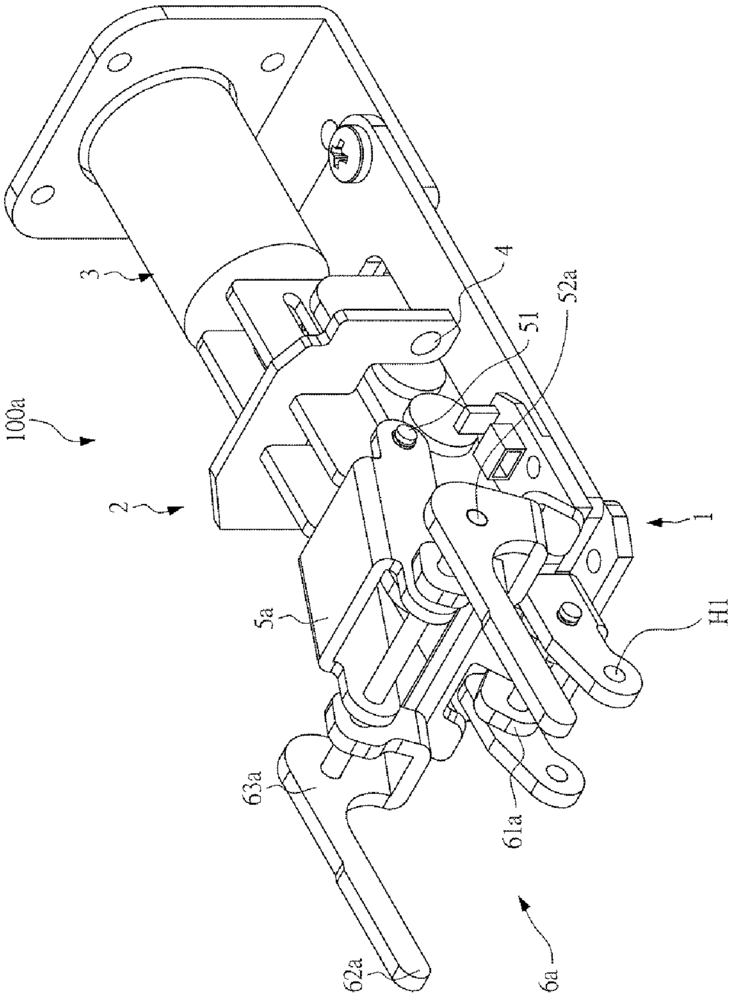
FIG. 13 demonstrates schematically that the unlocking transmission mechanism of FIG. 6 can be produced from part of the multi-selective kit of FIG. 11.

Refer to FIG. 11 to FIG. 13, and FIG. 1 to FIG. 10 simultaneously; where FIG. 11 is a schematic exploded view of a multi-selective kit of a third embodiment of the unlocking transmission mechanism, the electric control system and the emergency exit door lock in accordance with this invention, FIG. 12 demonstrates schematically that the unlocking transmission mechanism of FIG. 1 can be produced from part of the multi-selective kit of FIG. 11, and FIG. 13 demonstrates schematically that the unlocking transmission mechanism of FIG. 6 can be produced from part of the multi-selective kit of FIG. 11.

In this embodiment, a multi-selective kit for the unlocking transmission mechanism for an electric control system of an emergency exit door lock ("multi-selective kit" thereafter) 100_b_ can be selectively adopted to an inclined front press-bar type emergency exit door lock (i.e., the emergency exit door lock 300) or an inclined rear press-bar type emergency exit door lock (i.e., the emergency exit door lock 300_a_). With a proper adoption, the power transmission shaft 210 of the electric control system 200 can be used to lock/unlock the inclined front press-bar type emergency exit door lock or the inclined rear press-bar type emergency exit door lock, in which each of the inclined front press-bar type emergency exit door lock and the inclined rear press-bar type emergency exit door lock includes an inclined front press-bar type manual-operated press bar assembly (i.e., the manual-operated press bar assembly 310) or an inclined rear press-bar type manual-operated press bar assembly (i.e., the manual-operated press bar assembly 310_a_), respectively. The multi-selective kit 100_b_ includes the aforesaid fixed base assembly 1, the aforesaid slidable base assembly 2, the aforesaid linear driving assembly 3, the aforesaid magnet 4, the aforesaid transmission member 5, the aforesaid second pivotal shaft 52_a_, the aforesaid first linkage member 6, the aforesaid second linkage member 6_a_ and the aforesaid pin 7.

When the multi-selective kit 100_b_ is selected to modify the inclined front press-bar type emergency exit door lock (i.e., emergency exit door lock 300), the fixed base assembly 1, the slidable base assembly 2, the linear driving assembly 3, the magnet 4, the transmission member 5, the first linkage member 6 and the pin 7 in the multi-selective kit 100_b_ can be assembled, by referring to FIG. 1 to FIG. 5 and corresponding descriptions, to obtain the aforesaid unlocking transmission mechanism 100. Then, this unlocking transmission mechanism 100 can be assembled into the electric control system 200 and the inclined front press-bar type emergency exit door lock (i.e., the emergency exit door lock 300) so as to lock/unlock the inclined front press-bar type emergency exit door lock (i.e., the emergency exit door lock 300).

When the multi-selective kit 100_b_ is selected to modify the inclined rear press-bar type emergency exit door lock (i.e., emergency exit door lock 300_a_), the second pivotal shaft 52 of the transmission member 5 is firstly replaced by the second pivotal shaft 52_a_ so as to obtain the transmission member 5_a_, and then the fixed base assembly 1, the slidable base assembly 2, the linear driving assembly 3, the magnet 4, the transmission member 5_a_, the second linkage member 6_a_ and the pin 7 in the multi-selective kit 100_b_ can be assembled, by referring to FIG. 6 to FIG. 10 and corresponding descriptions, to obtain the aforesaid unlocking transmission mechanism 100_a_. Then, this unlocking transmission mechanism 100_a_ can be assembled into the electric control system 200 and the inclined rear press-bar type emergency exit door lock (i.e., the emergency exit door lock 300_a_) so as to lock/unlock the inclined rear press-bar type emergency exit door lock (i.e., the emergency exit door lock 300_a_).

As described above, since the unlocking transmission mechanism for an electric control system of an emergency exit door lock 100 or 100_a_ provided in this disclosure can be directly connected with the electric control system and the manual-operated press bar assembly 310 or 310_a_ of the existing emergency exit door lock 300 or 300_a_, thus the existing manual-operated press bar assembly 310 or 310_a_ can be integrated to unlock the emergency exit door lock 300 or 300_a_. Thus, the production cost for manufacturing an additional external-operated unlocking mechanism can be saved.

Preferably, in the multi-selective kit 100_b_ for the unlocking transmission mechanism for an electric control system of an emergency exit door lock provided in this disclosure, since various components (i.e., the fixed base assembly 1, the slidable base assembly 2, the linear driving assembly 3, the magnet 4, the transmission member 5, the second pivotal shaft 52_a_, the first linkage member 6, the second linkage member 6_a_ and the pin 7) common to different types of the emergency exit door locks are included, thus, according to different types of the emergency exit door locks 300, 300_a_ (i.e., the inclined front press-bar type emergency exit door lock and the inclined rear press-bar type emergency exit door lock), relevant selections from the multi-selective kit 100_b_ can be integrated to unlock the specific emergency exit door lock. Undoubtedly, by providing the multi-selective kit 100_b_, the additional production cost from manufacturing excessive external-operated unlocking mechanisms can be saved, the management cost in handling versatile accessories can be reduced, and the risk in adopting wrong components can be further lowered.

While the present invention has been particularly shown and described with reference to a preferred embodiment, it will be understood by those skilled in the art that various changes in form and detail may be without departing from the spirit and scope of the present invention.

What is claimed is:

1. An unlocking transmission mechanism for an electric control system of an emergency exit door lock, driven by a power transmission shaft of the electric control system to unlock the emergency exit door lock, the emergency exit door lock including a manual-operated press bar assembly, the unlocking transmission mechanism comprising:

a fixed base assembly, fixed to a press-bar base of the emergency exit door lock;

a slidable base assembly, disposed at the fixed base assembly within a linear sliding stroke to be reciprocally movable in an unlocking-driving direction;

a linear driving assembly, driven by the power transmission shaft to further drive the slidable base assembly to move in the unlocking-driving direction within the linear sliding stroke;

a magnet, disposed on the slidable base assembly;

a transmission member, having a first pivotal shaft and a second pivotal shaft, the first pivotal shaft being pivotally connected with the slidable base assembly; wherein, when the slidable base assembly moves in the unlocking-driving direction within the linear sliding stroke, the transmission member pivots about the first pivotal shaft to rotate the second pivotal shaft with respect to the first pivotal shaft;

a linkage member, pivotally connected with the second pivotal shaft and the fixed base assembly; wherein, when the second pivotal shaft rotates with respect to the first pivotal shaft, the linkage member pushes the manual-operated press bar assembly of the emergency exit door lock to unlock the emergency exit door lock;

wherein, when an electromagnetic distance sensor of the electric control system detects a distance of the magnet to ensure that the slidable base assembly has moved to an unlocked end position within the linear sliding stroke, the electric control system controls the power transmission shaft to stop driving the linear driving assembly, a resilience provided by the manual-operated press bar assembly drives sequentially the linkage member, the transmission member and the slidable base assembly to move the slidable base assembly in a locking-driving direction opposite to the unlocking-driving direction to arrive at a locked end position within the linear sliding stroke;

wherein the manual-operated press bar assembly includes a lower press bar and the press-bar base; a gap is formed between the lower press bar and the press-bar base; the linkage member includes a first linking portion, a second linking portion and a middle linking portion disposed between the first linking portion and the second linking portion, the first linking portion is pivotally connected with a middle pivotal hole of the fixed base assembly, the middle linking portion is pivotally connected with the second pivotal shaft, and the second linking portion is extended to enter the gap; and wherein, when the second pivotal shaft rotates with respect to the first pivotal shaft, the second linking portion is rotated with respect to the middle pivotal hole and to contact and push the lower press bar of the manual-operated press bar assembly so as to unlock the emergency exit door lock.

2. The unlocking transmission mechanism for an electric control system of an emergency exit door lock of claim 1, wherein the linear driving assembly includes:

a screw guide sleeve, driven by the power transmission shaft to rotate; and a screw bar, fixedly connected with the slidable base assembly, engaging the screw guide sleeve by screwing; wherein, when the screw guide sleeve is driven to rotate, the screw bar moves in the unlocking-driving direction within the linear sliding stroke, so as to drive the slidable base assembly synchronously to move in the unlocking-driving direction within the linear sliding stroke.

3. The unlocking transmission mechanism for an electric control system of an emergency exit door lock of claim 1, wherein the slidable base assembly is furnished with at least one positioning slot along the linear sliding stroke, the fixed base assembly includes at least one positioning pin, and the at least one positioning pin penetrates through the at least one positioning slot, so as to limit a movement of the slidable base assembly in the unlocking-driving direction.

4. The unlocking transmission mechanism for an electric control system of an emergency exit door lock of claim 1, wherein the slidable base assembly includes two longitudinal standing plates and a horizontal standing plate, the two longitudinal standing plates are parallel to each other in the unlocking-driving direction, each of the two longitudinal standing plates is furnished with a positioning slot, the fixed base assembly includes at least one positioning pin, and the at least one positioning pin penetrates through the positioning slot of each of the two longitudinal standing plates, so as to limit a movement of the slidable base assembly in the unlocking-driving direction; wherein the horizontal standing plate is crossly connected fixedly with the two longitudinal standing plates by being perpendicular to the unlocking-driving direction.

5. The unlocking transmission mechanism for an electric control system of an emergency exit door lock of claim 4, wherein the magnet is disposed at the horizontal standing plate.

* * * * *